United States Patent
Heninger et al.

(10) Patent No.: US 9,201,706 B2
(45) Date of Patent: Dec. 1, 2015

(54) MINIMIZING WORKLOAD MIGRATIONS DURING CLOUD MAINTENANCE OPERATIONS

(71) Applicant: International Business Machines Corporation, Armonk, NY (US)

(72) Inventors: Ivan M. Heninger, Selma, NC (US); Douglas A. Larson, Raleigh, NC (US); Aaron J. Quirk, Cary, NC (US); Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/792,450

(22) Filed: Mar. 11, 2013

(65) Prior Publication Data
US 2014/0258487 A1  Sep. 11, 2014

(51) Int. Cl.
*G06F 9/50* (2006.01)
*H04L 12/24* (2006.01)

(52) U.S. Cl.
CPC ............ *G06F 9/5083* (2013.01); *H04L 41/082* (2013.01)

(58) Field of Classification Search
CPC combination set(s) only.
See application file for complete search history.

(56) References Cited

U.S. PATENT DOCUMENTS

| | | | |
|---|---|---|---|
| 8,205,193 B2* | 6/2012 | Hertling et al. | 717/166 |
| 8,560,368 B1* | 10/2013 | Maity et al. | 705/7.13 |
| 2005/0091354 A1* | 4/2005 | Lowell et al. | 709/223 |
| 2010/0235557 A1* | 9/2010 | Guo et al. | 710/260 |
| 2010/0241910 A1* | 9/2010 | Baxter et al. | 714/49 |
| 2011/0099266 A1 | 4/2011 | Calder et al. | |
| 2012/0110186 A1 | 5/2012 | Kapur et al. | |
| 2012/0110570 A1* | 5/2012 | Jacobson et al. | 718/1 |
| 2012/0204051 A1* | 8/2012 | Murakami et al. | 713/324 |
| 2012/0221744 A1 | 8/2012 | Heywood et al. | |
| 2012/0221845 A1 | 8/2012 | Ferris | |
| 2012/0297238 A1* | 11/2012 | Watson et al. | 714/4.11 |
| 2013/0290406 A1* | 10/2013 | Calvin et al. | 709/203 |
| 2014/0089916 A1* | 3/2014 | Gross et al. | 718/1 |
| 2014/0137104 A1* | 5/2014 | Nelson et al. | 718/1 |
| 2014/0215486 A1* | 7/2014 | DeRosa et al. | 718/105 |

OTHER PUBLICATIONS

Mell et al., "The NIST Definition of Cloud Computing," Special Publication 800-145, Sep. 2011.

(Continued)

*Primary Examiner* — Ebrahim Golabbakhsh
(74) *Attorney, Agent, or Firm* — Robert A. Voigt, Jr.; Winstead, P.C.

(57) ABSTRACT

A method, system and computer program product for minimizing workload migrations during cloud maintenance operations. Upon receiving an indication that a scheduled maintenance operation is to be performed, a cloud controller uploads the maintenance binaries associated with the scheduled maintenance operation and analyzes the maintenance binaries so as to evaluate the requirements of the maintenance packages and dependencies associated with the scheduled maintenance operation. A matrix is then generated by the cloud controller to identify the classes of hardware that will be disrupted by the scheduled maintenance operation based on the analysis. The workloads running on the classes of hardware identified in the matrix will then be consolidated prior to the scheduled maintenance operation. By consolidating the workloads onto a fewer number of hardware components, a fewer number of workload migrations will need to be performed during the cloud maintenance operation.

14 Claims, 6 Drawing Sheets

(56) References Cited

OTHER PUBLICATIONS

"Unitask Success Story," http://www.unitask.com/success-story-marvell, 2012.

"VMware vCenter Site Recovery Manager," http://www.vmware.com/products/site-recovery-manager, 2012.

"The New Economics of Telecom Networks-Bringing Value Back to the Network," Strategic White Paper for Alcatel-Lucent, http://images.tmcnet.com/online-communities/ngc/pdfs/application-enablement/whitepapers/The-New-Economics-of-Telecom-Networks.pdf, 2009.

Office Action for U.S. Appl. No. 14/068,394 dated Mar. 27, 2015, pp. 1-28.

\* cited by examiner

MINIMIZING WORKLOAD MIGRATIONS DURING CLOUD MAINTENANCE OPERATIONS

TECHNICAL FIELD

The present invention relates generally to cloud computing, and more particularly to minimizing the workload migrations during cloud maintenance operations.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The workloads of the cloud computing environment are supported by many types of hardware and software in the cloud computing environment which may require updates to enable them to operate correctly. For example, hardware components, such as network switches, fiber optic devices, physical compute machines and power distribution units, need to be updated to enable them to continue to operate correctly. Software components, such as operating systems, middleware applications (e.g., message queues, databases, application servers), user application binaries and cloud controller logic, may also need to be updated to enable them to continue to operate correctly. Unfortunately, such updates to these hardware and software components may result in disruptive behavior, such as requiring hardware components (e.g., physical compute machines) to be taken offline to complete their update. As a result of such disruptive behavior, the workloads running on those components have to be migrated to redundant systems during the maintenance window so that the components can be completely updated.

However, such migrations require a significant amount of time, resources and planning During a migration of a workload, the active memory and possibly the storage unit, such as a virtual disk(s), of the target workload are transferred over the network in real time to a different hardware component in the cloud computing environment. Such a process may be lengthy in time since the resources utilized by the workloads may easily be on the order of many gigabytes. These transfers reduce network and target workload throughput since the memory and disk modifications need to be resolved during the migration. If, however, the number of these migrations for the workloads could be reduced during the cloud maintenance operations, then the performance penalty incurred to both the infrastructure and the workload could be reduced during the cloud maintenance operations.

BRIEF SUMMARY

In one embodiment of the present invention, a method for minimizing workload migrations during cloud maintenance operations comprises receiving an indication that a scheduled maintenance operation on designated cloud hardware and software will occur at a specified time. The method further comprises uploading maintenance binaries associated with the scheduled maintenance operation in response to receiving the indication. Additionally, the method comprises analyzing the maintenance binaries to evaluate requirements of maintenance packages and dependencies associated with the scheduled maintenance operation. Furthermore, the method comprises generating a matrix to identify classes of hardware implementing the designated cloud hardware and software that will be disrupted by the scheduled maintenance operation based on the analysis. The method additionally comprises consolidating workloads running on the classes of hardware identified in the matrix so as to idle one or more hardware components in the classes of hardware identified in the matrix prior to the scheduled maintenance operation. The method further comprises starting the scheduled maintenance operation at the specified time. Furthermore, the method comprises updating the one or more idle hardware components prior to updating non-idle hardware components in the classes of hardware identified in the matrix in response to starting the schedule maintenance operation. In addition, the method comprises migrating, by a processor, workloads running on the non-idle hardware components across the one or more idle components after updating the one or more idle hardware components.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for minimizing workload migrations during cloud maintenance operations. In one embodiment of the present invention, a cloud controller receives an indication that a scheduled maintenance operation is to be performed on designated cloud hardware and software at a specified time. Upon receiving the indication, the cloud controller uploads the maintenance binaries associated with the scheduled maintenance operation and analyzes the maintenance binaries so as to evaluate the requirements of the maintenance packages and dependencies associated with the scheduled maintenance operation. A matrix is then generated by the cloud controller to identify the classes of hardware implementing the designated cloud hardware and software that will be disrupted by the scheduled maintenance operation based on the analysis. The workloads running on the classes of hardware identified in the matrix will then be consolidated by the cloud controller so as to idle as many hardware components in the classes of hardware identified in the matrix prior to the scheduled maintenance operation. By consolidating the workloads onto a fewer number of hardware components, a fewer number of workload migrations will need to be performed during the cloud maintenance operation thereby reducing the performance penalty incurred to both the cloud infrastructure and the workload during the cloud maintenance operation. Furthermore, since there are hardware components that are idled, the installation of the updates during the cloud maintenance operation may be performed more quickly since the time to update an idled hardware component can occur more quickly than the time to update a non-idled hardware component.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
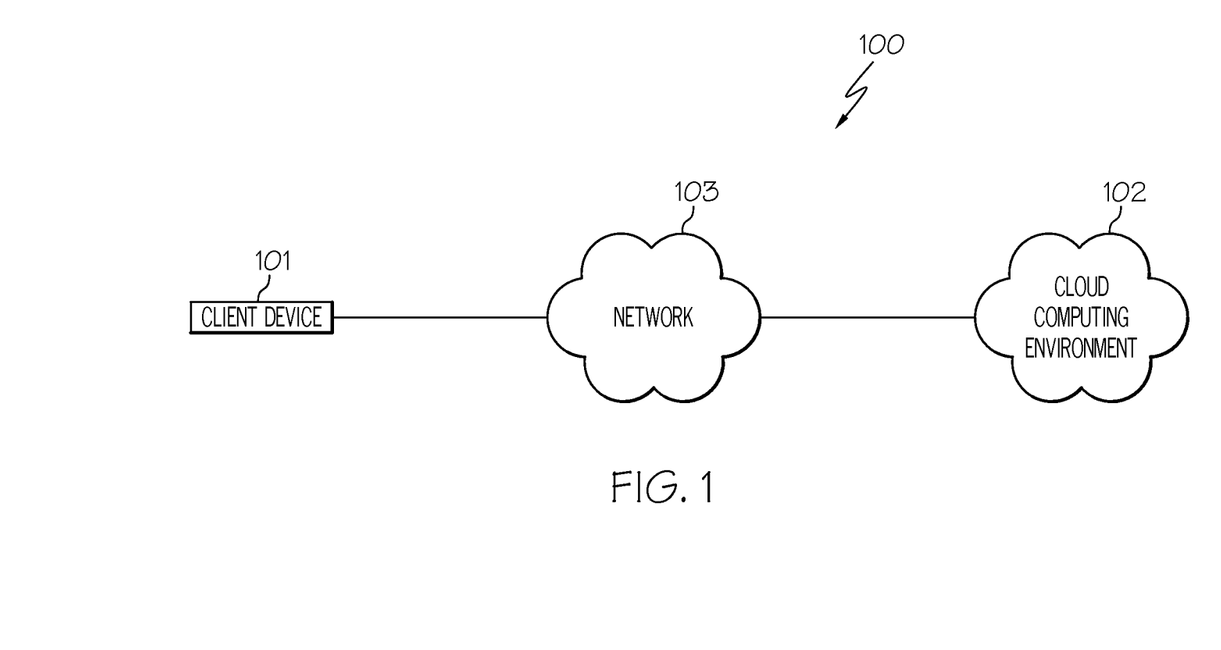
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
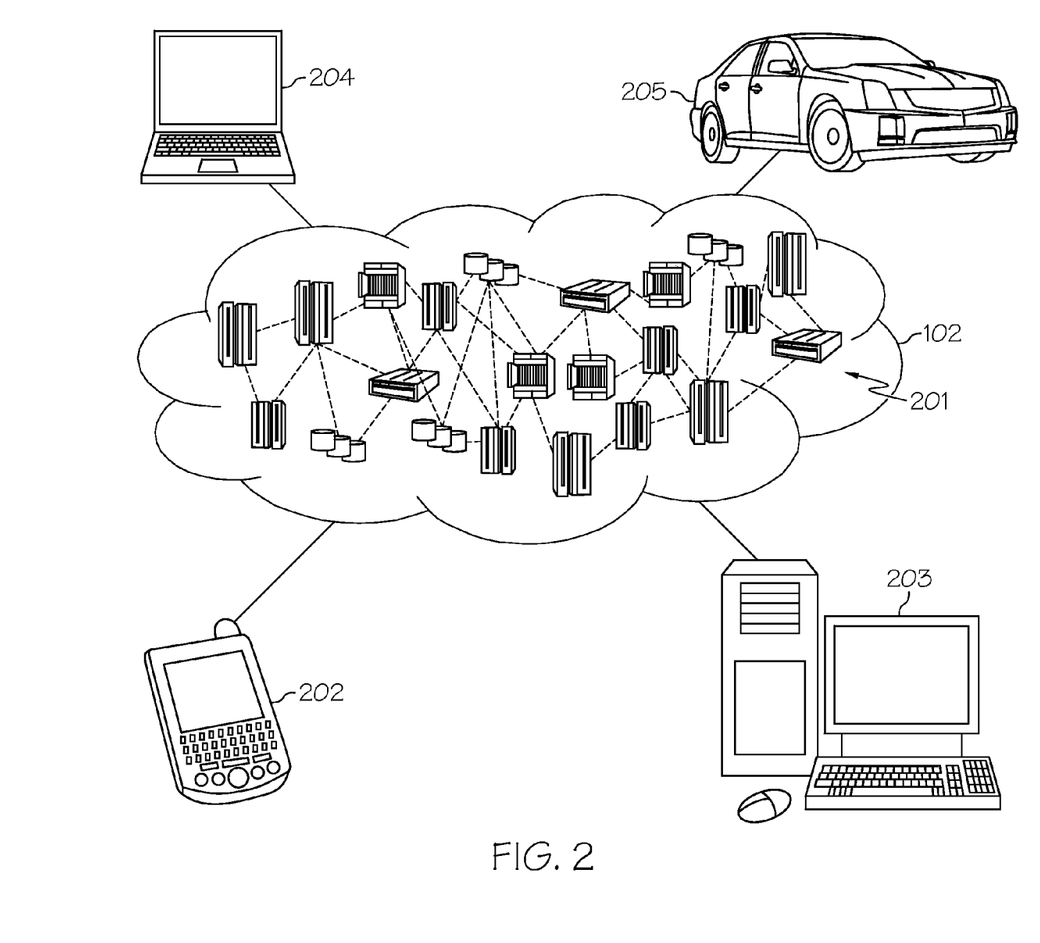
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
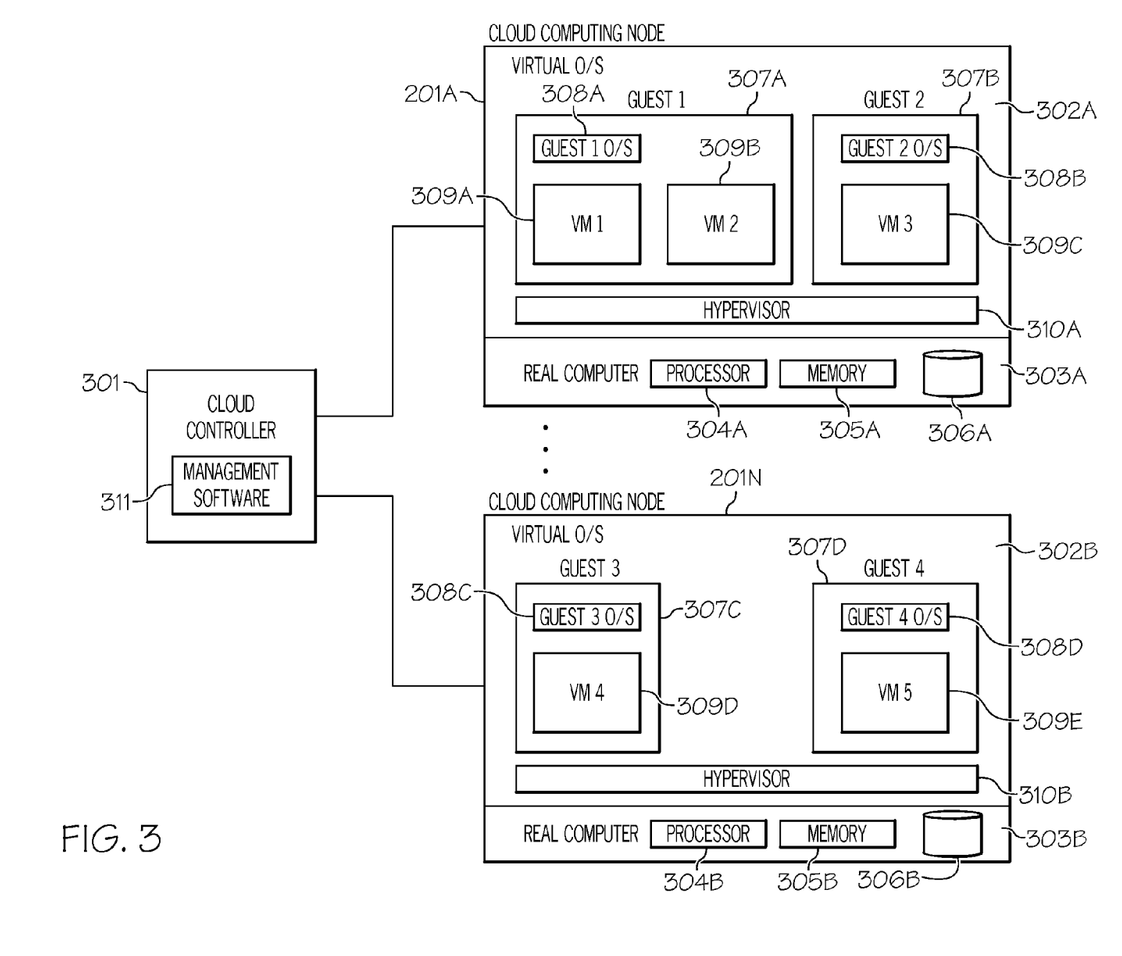
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to a cloud controller 301 configured to provide data center-level functions.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1" and "Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3" and "Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, cloud controller 301 supports a module, referred to herein as the management software 311, that can be used to manage all the hardware components of cloud computing nodes 201, monitor system utilization, intelligently deploy images of data and optimize the operations of cloud computing environment 102. Furthermore, management software 311 can be used to minimize workload migrations during cloud maintenance operations as discussed further below. A description of the hardware configuration of cloud controller 301 is provided below in connection with FIG. 4.

Figure 4:
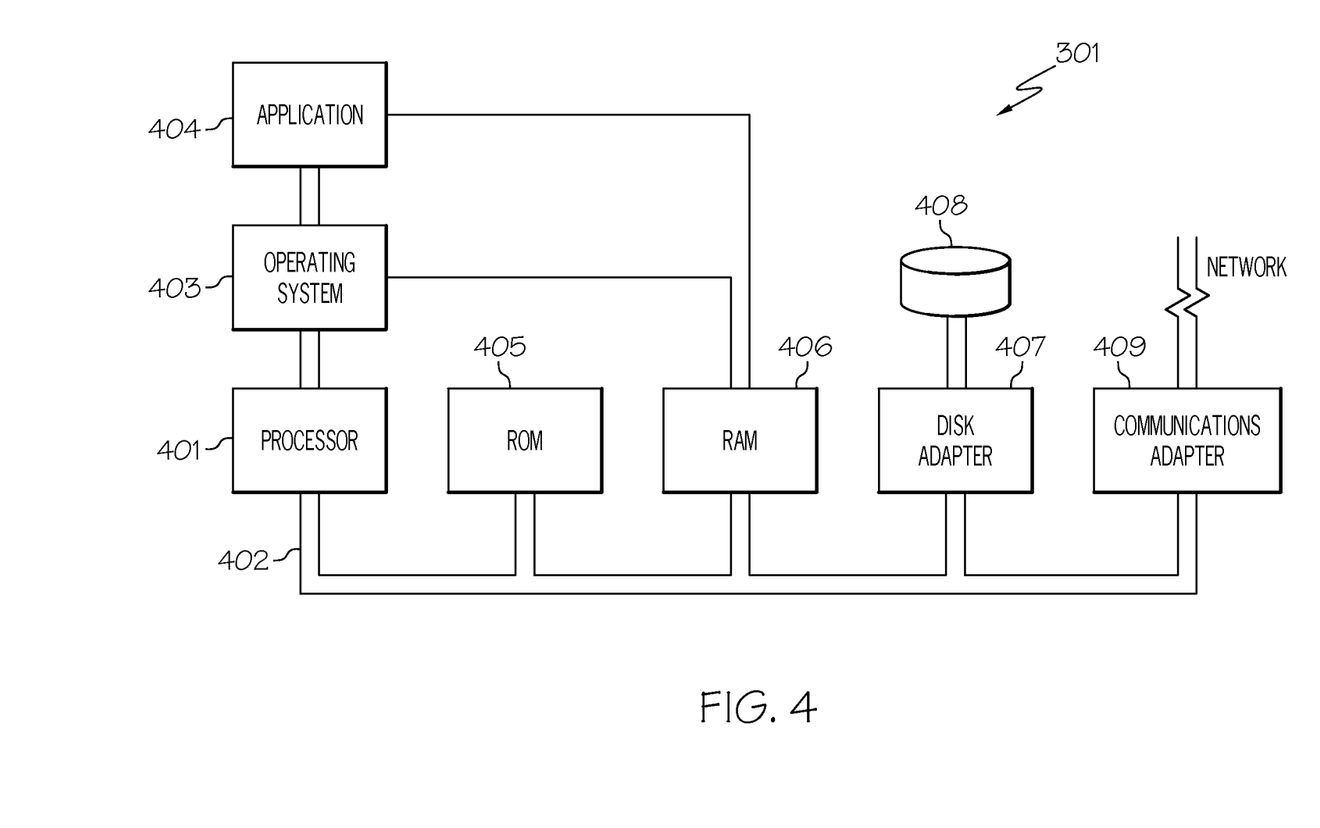
FIG. 4 illustrates a hardware configuration of a cloud controller configured in accordance with an embodiment of the present invention.

Referring now to FIG. 4, FIG. 4 illustrates a hardware configuration of cloud controller 301 (FIG. 4) which is representative of a hardware environment for practicing the present invention. Cloud controller 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 311 of FIG. 3, for minimizing workload migrations during cloud maintenance operations as discussed further below in association with FIGS. 5A-5B.

Referring again to FIG. 4, read-only memory ("ROM") 405 is coupled to system bus 402 and includes a basic input/output system ("BIOS") that controls certain basic functions of cloud controller 301. Random access memory ("RAM") 406 and disk adapter 407 are also coupled to system bus 402. It should be noted that software components including operating system 403 and application 404 may be loaded into RAM 406, which may be cloud controller's 301 main memory for execution. Disk adapter 407 may be an integrated drive electronics ("IDE") adapter that communicates with a disk unit 408, e.g., disk drive. It is noted that the program for minimizing workload migrations during cloud maintenance operations, as discussed further below in association with FIGS. 5A-5B, may reside in disk unit 408 or in application 404.

Cloud controller 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the workloads of the cloud computing environment are supported by many types of hardware and software in the cloud computing environment which may require updates to enable them to operate correctly. Unfortunately, such updates to these hardware and software components may result in disruptive behavior, such as requiring hardware components (e.g., physical compute machines) to be taken offline to complete their update. As a result of such disruptive behavior, the workloads running on those components have to be migrated to redundant systems during the maintenance window so that the components can be completely updated. However, such migrations require a significant amount of time, resources and planning During a migration of a workload, the active memory and possibly the storage unit, such as a virtual disk(s), of the target workload are transferred over the network in real time to a different hardware component in the cloud computing environment. Such a process may be lengthy in time since the resources utilized by the workloads may easily be on the order of many gigabytes. These transfers reduce network and target workload throughput since the memory and disk modifications need to be resolved during the migration. If, however, the number of these migrations for the workloads could be reduced during the cloud maintenance operations, then the performance penalty incurred to both the infrastructure and the workload could be reduced during the cloud maintenance operations.

The principles of the present invention provide a means for minimizing workload migrations during cloud maintenance operations thereby reducing the performance penalty incurred to both the cloud infrastructure and the workload during the cloud maintenance operations as discussed below in connection with FIGS. 5A-5B.

Figure 5A:
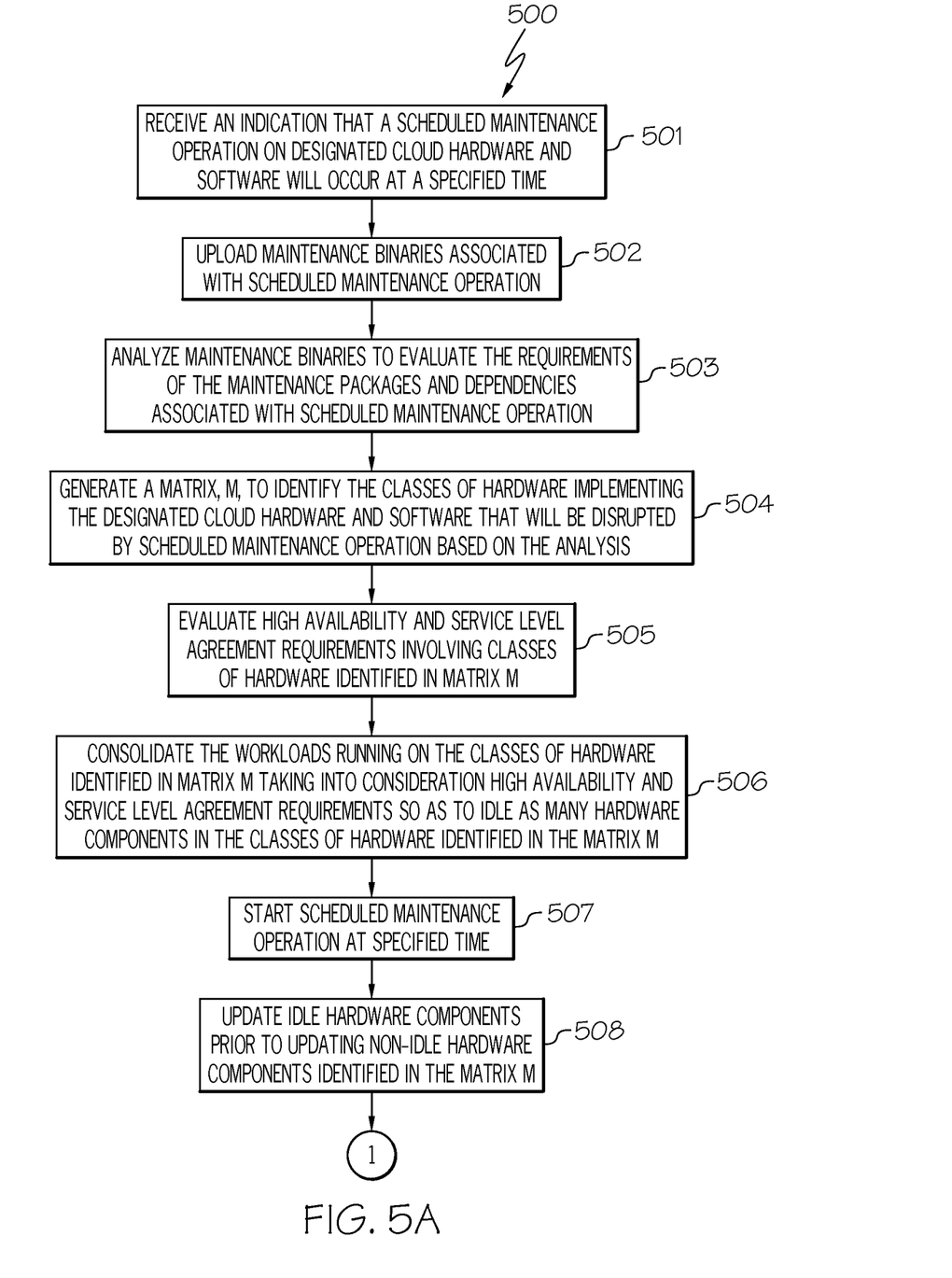
FIGS. 5A-5B are a flowchart of a method for minimizing workload migrations during cloud maintenance operations in accordance with an embodiment of the present invention.
Figure 5B:
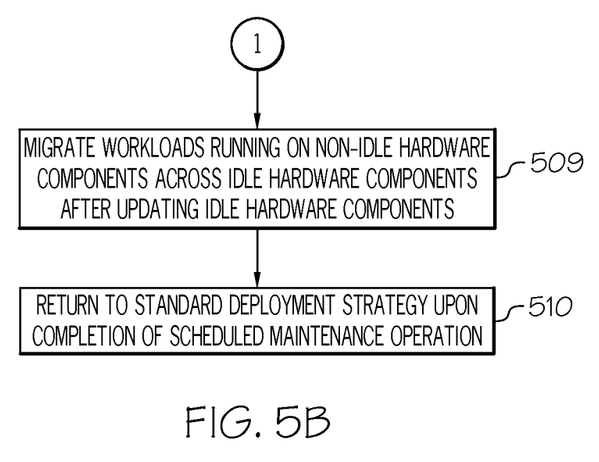

FIGS. 5A-5B are a flowchart of a method 500 for minimizing workload migrations during cloud maintenance operations in accordance with an embodiment of the present invention.

Referring to FIG. 5A, in conjunction with FIGS. 1-4, in step 501, cloud controller 301 receives an indication that a scheduled maintenance operation on designated cloud hardware and software will occur at a specified time (e.g., will occur in N-days at a specified time, where N is a positive integer number). Examples of cloud hardware that may be scheduled to be updated include hardware components, such as network switches, fiber optic devices, physical compute machines and power distribution units. Examples of cloud software that may be scheduled to be updated include software components, such as operating systems, middleware applications (e.g., message queues, databases, application servers), user application binaries and cloud controller logic (e.g., management software 311). The examples listed above concerning the cloud hardware and software that may be updated is not to be limiting. The principles of the present invention are to include any type of hardware and software used in the cloud computing environment 102 that may need to be updated in order to ensure they continue to operate correctly.

In step 502, cloud controller 301 uploads the maintenance binaries (data encoded in binary form) associated with the scheduled maintenance operation in response to receiving the indication of the cloud maintenance operation in step 501.

In step 503, cloud controller 301 analyzes the maintenance binaries to evaluate the requirements of the maintenance packages and dependencies associated with the scheduled maintenance operation. In one embodiment, a maintenance package refers to the collection of maintenance services used for updating the hardware and software components used in servicing the computing requirements of the user of client 101. In one embodiment, the "dependencies" refer to the hardware and software components that are dependent upon other hardware and software components. As a result, an update to a hardware or software component may require an update of another hardware or software component.

In step 504, cloud controller 301 generates a matrix, M, to identify the classes of hardware (e.g., mass storage class, networking device class, power distribution class, fiber optic device class, computing class) implementing the designated cloud hardware and software that will be disrupted by the scheduled maintenance operation based on the analysis of step 503. "Disruption," as used herein, refers to the interruption of the normal course of operation of the hardware component. By identifying the classes of hardware that will be adversely affected by the scheduled maintenance operation, cloud controller 301 will be able to consolidate the workloads ahead of the cloud maintenance operation so as to minimize the number of workload migrations during the cloud maintenance operation as discussed further below.

In step 505, cloud controller 301 evaluates the high availability and service level agreement requirements involving the classes of hardware identified in the matrix M. High availability refers to ensuring a prearranged level of operational performance will be met during a contractual measurement period (e.g., having a backup computing node 201 in case one of the computing nodes 201 fails). A service level agreement refers to a service contract with a user of client 101 where the servicing of the computing requirements of the user of client 101 is formally defined.

In step 506, prior to the scheduled maintenance operation, cloud controller 301 consolidates the workloads running on the classes of hardware identified in matrix M taking into consideration the high availability and service level agreement requirements so as to idle as many hardware components in the classes of hardware identified in the matrix M. By consolidating the workloads onto a fewer number of hardware components, a fewer number of workload migrations will need to be performed during the cloud maintenance operation thereby reducing the performance penalty incurred to both the cloud infrastructure and the workload during the cloud maintenance operation. That is, by consolidating the workloads onto a fewer number of hardware components, the time required to perform the cloud maintenance operation is reduced thereby reducing the performance penalty incurred to both the cloud infrastructure and the workload.

Furthermore, when the workloads are consolidated onto a fewer number of hardware components, those hardware components that are no longer running workloads are idled. These hardware components can be first updated during the scheduled maintenance operation followed by having the workloads running on the non-idled hardware components migrate to the idled hardware components so that the non-idled hardware components can be updated as discussed further below. Since there are hardware components that are idled, the installation of the updates during the cloud maintenance operation may be performed more quickly since the time to update an idled hardware component can occur more quickly than the time to update a non-idled hardware component.

Furthermore, as discussed above, cloud controller 301 consolidates the workloads running on the classes of hardware identified in the matrix M taking into consideration the high availability and service level agreement requirements. By taking into consideration the high availability and service level agreement requirements, cloud controller 301 ensures that such requirements will continue to be met while at the same time reducing the number of workload migrations during the cloud maintenance operation.

In one embodiment, the workloads running on the classes of hardware identified in the matrix M are consolidated by migrating one or more of these workloads onto one or more other non-idled hardware components over a determined low utilization period. In this manner, by migrating these workloads over a low utilization period, the reduction of network and target workload throughput will be minimized. Furthermore, the workloads may be migrated over a longer period of time thereby lessening the performance penalty.

In one embodiment, each workload running on the classes of hardware identified in the matrix M includes a collection of virtual machines. The workloads may then be consolidated by deploying them onto a hypervisor 310 of a particular cloud computing node 201.

In step 507, cloud controller 301 starts the schedule maintenance operation at the specified time.

In step 508, cloud controller 301 updates the idle hardware components prior to updating the non-idle hardware components identified in the matrix M in response to starting the schedule maintenance operation.

Referring now to FIG. 5B, in conjunction with FIGS. 1-4, in step 509, cloud controller 301 migrates the workloads running on the non-idle hardware components across the updated idle hardware components after updating the idle hardware components.

In step 510, cloud controller 301 returns to the standard deployment strategy (i.e., the deployment strategy implemented prior to implementing method 500 for minimizing the workload migrations during the cloud maintenance operation) upon completion of the scheduled maintenance operation.

In some implementations, method 500 may include other and/or additional steps that, for clarity, are not depicted. Further, in some implementations, method 500 may be executed in a different order presented and that the order presented in the discussion of FIGS. 5A-5B is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for minimizing workload migrations during cloud maintenance operations, the computer program product comprising the programming instructions for:
   receiving an indication that a scheduled maintenance operation on designated cloud hardware and software will occur at a specified time;
   uploading maintenance binaries associated with said scheduled maintenance operation in response to receiving said indication;
   analyzing said maintenance binaries to evaluate requirements of maintenance packages and dependencies associated with said scheduled maintenance operation;
   generating a matrix to identify classes of hardware implementing said designated cloud hardware and software that will be disrupted by said scheduled maintenance operation based on said analysis;
   consolidating workloads running on said classes of hardware identified in said matrix so as to idle one or more hardware components in said classes of hardware identified in said matrix prior to said scheduled maintenance operation;
   starting said scheduled maintenance operation at said specified time;
   updating said one or more idle hardware components prior to updating non-idle hardware components in said classes of hardware identified in said matrix in response to starting said schedule maintenance operation; and
   migrating workloads running on said non-idle hardware components across said one or more idle components after updating said one or more idle hardware components.

2. The computer program product as recited in claim 1 further comprising the programming instructions for:
   evaluating high availability and service level agreement requirements involving said classes of hardware identified in said matrix; and
   consolidating said workloads running on said classes of hardware identified in said matrix taking into consideration said high availability and service level agreement requirements so as to idle said one or more hardware components in said classes of hardware identified in said matrix.

3. The computer program product as recited in claim 2, wherein said workloads running on said classes of hardware identified in said matrix are consolidated by migrating one or more of said workloads onto one or more of said non-idle hardware components over a low utilization period.

4. The computer program product as recited in claim 1, wherein each of said workloads running on said classes of hardware identified in said matrix comprises a collection of virtual machines.

5. The computer program product as recited in claim 4, wherein a workload is consolidated by deploying said collection of virtual machines onto a hypervisor.

6. The computer program product as recited in claim 1 further comprising the programming instructions for:
   returning to a standard deployment strategy upon completion of said scheduled maintenance operation.

7. The computer program product as recited in claim 1, wherein said designated hardware and software comprises one or more of the following:
network switches, fiber optic devices, physical compute machines, power distribution units, operating systems, middleware applications, user application binaries and cloud controller logic.

8. A system, comprising:
a memory unit for storing a computer program for minimizing workload migrations during cloud maintenance operations; and
a processor coupled to said memory unit, wherein the processor is configured to execute the program instructions of the computer program comprising:
receiving an indication that a scheduled maintenance operation on designated cloud hardware and software will occur at a specified time;
uploading maintenance binaries associated with said scheduled maintenance operation in response to receiving said indication;
analyzing said maintenance binaries to evaluate requirements of maintenance packages and dependencies associated with said scheduled maintenance operation;
generating a matrix to identify classes of hardware implementing said designated cloud hardware and software that will be disrupted by said scheduled maintenance operation based on said analysis;
consolidating workloads running on said classes of hardware identified in said matrix so as to idle one or more hardware components in said classes of hardware identified in said matrix prior to said scheduled maintenance operation;
starting said scheduled maintenance operation at said specified time;
updating said one or more idle hardware components prior to updating non-idle hardware components in said classes of hardware identified in said matrix in response to starting said schedule maintenance operation; and
migrating workloads running on said non-idle hardware components across said one or more idle components after updating said one or more idle hardware components.

9. The system as recited in claim 8, wherein the program instructions of the computer program further comprises:
evaluating high availability and service level agreement requirements involving said classes of hardware identified in said matrix; and
consolidating said workloads running on said classes of hardware identified in said matrix taking into consideration said high availability and service level agreement requirements so as to idle said one or more hardware components in said classes of hardware identified in said matrix.

10. The system as recited in claim 9, wherein said workloads running on said classes of hardware identified in said matrix are consolidated by migrating one or more of said workloads onto one or more of said non-idle hardware components over a low utilization period.

11. The system as recited in claim 8, wherein each of said workloads running on said classes of hardware identified in said matrix comprises a collection of virtual machines.

12. The system as recited in claim 11, wherein a workload is consolidated by deploying said collection of virtual machines onto a hypervisor.

13. The system as recited in claim 8, wherein the program instructions of the computer program further comprises:
returning to a standard deployment strategy upon completion of said scheduled maintenance operation.

14. The system as recited in claim 8, wherein said designated hardware and software comprises one or more of the following: network switches, fiber optic devices, physical compute machines, power distribution units, operating systems, middleware applications, user application binaries and cloud controller logic.

* * * * *